United States Patent [19]
Van den Sype

[11] Patent Number: 5,419,857
[45] Date of Patent: May 30, 1995

[54] THERMAL REMOVAL OF BINDERS FROM CERAMIC-PARTICLE BODIES

[75] Inventor: Jaak S. Van den Sype, Scarsdale, N.Y.

[73] Assignee: Praxair Technology, Inc., Danbury, Conn.

[21] Appl. No.: 106,957

[22] Filed: Aug. 17, 1993

[51] Int. Cl.⁶ .................................................. C04B 38/06
[52] U.S. Cl. ................................. 264/40.1; 264/63; 264/344
[58] Field of Search ................... 264/40.1, 63, 344

[56] References Cited

U.S. PATENT DOCUMENTS

| | | | |
|---|---|---|---|
| 4,011,291 | 3/1977 | Curry | 264/43 |
| 4,305,756 | 12/1981 | Wiech, Jr. | 75/211 |
| 4,795,598 | 1/1989 | Billiet | 264/63 |
| 4,994,436 | 2/1991 | Giacobbe | 505/1 |
| 5,078,929 | 1/1992 | Matsumae | 264/344 |
| 5,080,846 | 1/1992 | Kim et al. | 264/344 |
| 5,089,070 | 2/1992 | McAndrew | 264/344 |
| 5,122,326 | 6/1992 | Jackson | 264/344 |

FOREIGN PATENT DOCUMENTS 0325317  7/1989  European Pat. Off.

OTHER PUBLICATIONS

S. L. Madorsky and S. Straus, "Thermal Degradation of Polyethylene Oxide and Polypropylene Oxide", Journal of Polymer Science, vol. XXXVI, 1959, pp. 183–194.

*Primary Examiner*—James Derrington
*Attorney, Agent, or Firm*—Alvin H. Fritschler

[57] ABSTRACT

A process for removing binder from a body comprising ceramic particles and binder by heating the body at a substantially constant rate of temperature rise over the temperature range where a peak rate of body weight loss occurs in a gaseous environment of inert gas and oxidizer wherein the oxidizer concentration varies with the rate of temperature rise to reduce the peak rate of body weight loss.

11 Claims, 3 Drawing Sheets

THERMAL REMOVAL OF BINDERS FROM CERAMIC-PARTICLE BODIES

BACKGROUND

This invention relates to the thermal removal of binder from green bodies of ceramic particles and binder, more specifically to tolerable rates of green body temperature rise in combination with oxidizer concentration in a debinding environment of inert gas and oxidizer.

Ceramic structures are typically formed by initially combining a binder with ceramic particles or ceramic powder to form a malleable mixture. The mixture is shaped by one or more of a variety of processes, such as injection molding, extrusion, or tape casting into a green body. The green body is subsequently heated, usually in air, to drive out the binder and to sinter the ceramic particles together to form the desired structure. During the initial stages of heating, typically to approximately 800K, binder evolves from the body by thermal decomposition and evaporation.

The debinding phase of the heating is critical in the formation of sound ceramic structures. During the debinding phase, body damage such as bloating, internal pores or cracks may be produced by the internal pressure exerted by the evolving gas. The possibility of damage is increased by using submicron particles recently introduced for advanced ceramic components.

To avoid debinding damage to the body, low rates of body temperature rise are usually employed which result in undesirably long processing time. Often the debinding is conducted by moving bodies continuously through a furnace having a long heating path. However body temperature rise rate is difficult to control, and, particularly to vary in a selected schedule, during the course of travel of the bodies through such a furnace.

To reduce debinding time, several methods have been employed in the prior art. One approach disclosed in European Patent Office Publication Number 325,317 has been to continuously weigh a batch of bodies during heating in a furnace while adjusting the heating rate to keep the weight loss rate below a selected level which has been previously determined to yield undamaged sintered bodies.

Another method disclosed in U.S. Pat. No. 4,011,291 has been to pack the green body into a binder-absorptive material, and controllably heat the body above the melting point of the binder, but below the vaporization point of the binder. Binder is drawn from the green body by wicking action. Subsequently the body is fired.

Yet another method disclosed in U.S. Pat. No. 4,305,756 has been to heat green bodies a chamber wherein the pressure is raised above the vapor pressure of the binder in the green body at the temperature within the chamber. The latter three methods require costly apparatus, and being batch operations, suffer from low production rates. A debinding process is needed which is readily controllable, requires small initial investment in apparatus, has high rates of production and provides short debinding time.

SUMMARY

The present invention satisfies the above needs for binders having a specific characteristic. The inventor has discovered that the maximum rate of evolution of some kinds of binder from a green body is a function not only of the rate of body temperature rise, but also of the oxidizer concentration in the gaseous environment provided during the debinding. Accordingly a debinding process has been invented which employs combinations of body temperature rise rate and oxidizer concentration that reduce debinding time. Also provided is a method of determining such desirable combinations of temperature rise rate and oxidizer concentration.

Accordingly, one aspect of the present invention is a process for producing an article of sintered particulates and binder. The process comprises:
  (a) forming a green body from particulates and a binder which at a constant heating rate loses 50% weight in inert gas at a temperature at least 75K higher than in air;
  (b) heating the green body to a temperature at which body weight loss ceases;
  (c) controlling the heating to cause a substantially constant rate of temperature rise in the body over the temperature range where a peak rate of body weight loss occurs; and
  (d) providing during the heating a gaseous environment of inert gas and oxidizer;
  (e) varying the oxidizer concentration in the gaseous environment with the rate of temperature rise so as to reduce the peak rate of body weight loss.

Another aspect of the present invention is a method of determining effective oxidizer concentration range for removing binder from a body comprising particulates and binder during heating in a gaseous atmosphere of oxidizer and inert gas. The method comprises:
  (a) forming a green body from particulates and a binder which at a constant heating rate loses 50% weight in inert gas at a temperature at least 75K higher than in air;
  (a) heating a specimen representative of the green body at a substantially constant temperature rise rate to a temperature at which specimen weight loss ceases;
  (b) providing during the heating a gaseous environment of inert gas containing a constant oxidizer concentration;
  (c) measuring the peak specimen weight loss rate occurring during the heating;
  (d) repeating the above steps for several different oxidizer concentrations; and
  (e) selecting the oxygen concentrations at which peak specimen weight loss rates not greater than 130% of the lowest peak specimen weight loss rate occur at the constant temperature rise rate.

DRAWINGS

These and other features, aspects and advantages of the present invention will become better understood with reference to the following description, appended claims, and accompanying drawings where:

DESCRIPTION

Useful binders in ceramics production include polymers and copolymers of ethylene oxide, propylene oxide and acetyls. These polymers have an oxygen linkage in their main chain, and desirably leave low carbonaceous residues when heated. Polyethylene glycol is typical of such polymers, and has long been used as a binder in ceramics manufacturing. Polyacetyl is also one of such polymers and has been only recently employed as a binder. These binders are eliminated from a green body containing ceramic particles and binder by heating in a gaseous environment.

Characteristically these polymers are more stable when heated in inert gas than when heated in air, that is, when a green body containing such a binder is heated in inert gas, binder evolution begins at a higher temperature than when the body is heated in air. Correspondingly, in inert gas, most of the binder evolution occurs at a higher average temperature compared to that in air. For a body containing such a binder, at a given constant heating rate, the temperature at which 50% body weight loss occurs in inert gas is at least 75 and often 100 Kelvin degrees higher than the temperature at which 50% body weight loss occurs in air. A binder having such characteristics can be removed more rapidly from a green body by heating at greater rates than heretofore possible without damage by utilizing the present invention.

One aspect of the present invention is directed to a method of determining a range of effective oxidizer concentration in an environment of inert gas and oxygen which will allow a more rapid rate of temperature rise during heating of the green body. The method comprises heating a specimen representative of the body at a substantially constant rate of temperature rise to a temperature at which specimen weight loss ceases. A specimen may be an expendable unit of the body itself, or a geometrically simpler body, more easily and inexpensively fabricated for expendable test purposes from materials similar to those that would comprise the body. For the purposes of this invention, a rate of temperature rise that varies no more than 20% from a mean rate of rise may be considered substantially constant. Heating rates from about 1 to up to about 80 Kelvin degrees per minute may be used. Heating rates from about 5 to 20 Kelvin degrees per minute are more practical and are preferred.

Figure 1:
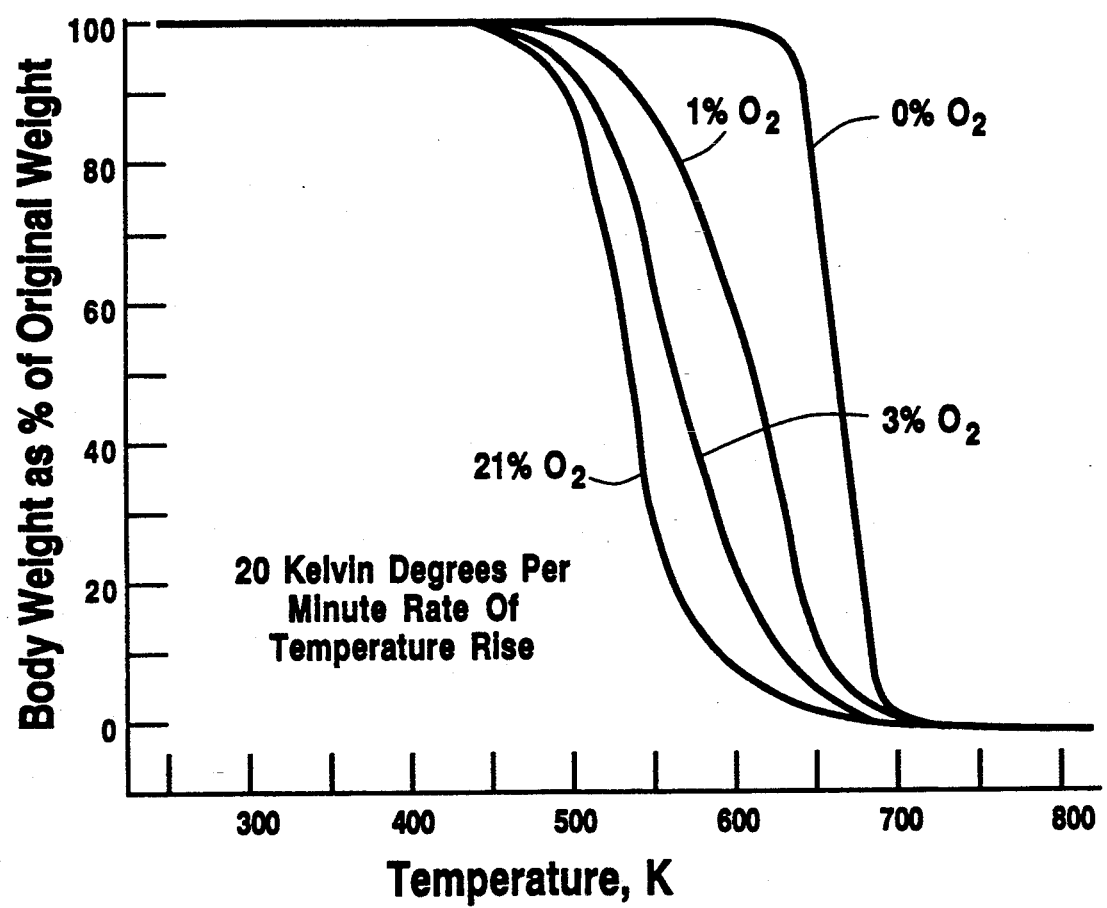
FIG. 1 is a plot of body weight, as a percentage of green body weight, that is, original body weight, observed for specimens during heating individually at a constant rate of body temperature rise of 20 Kelvin degrees per minute in an environment of nitrogen and oxygen, a different concentration of oxygen being provided for each specimen.
Figure 2:
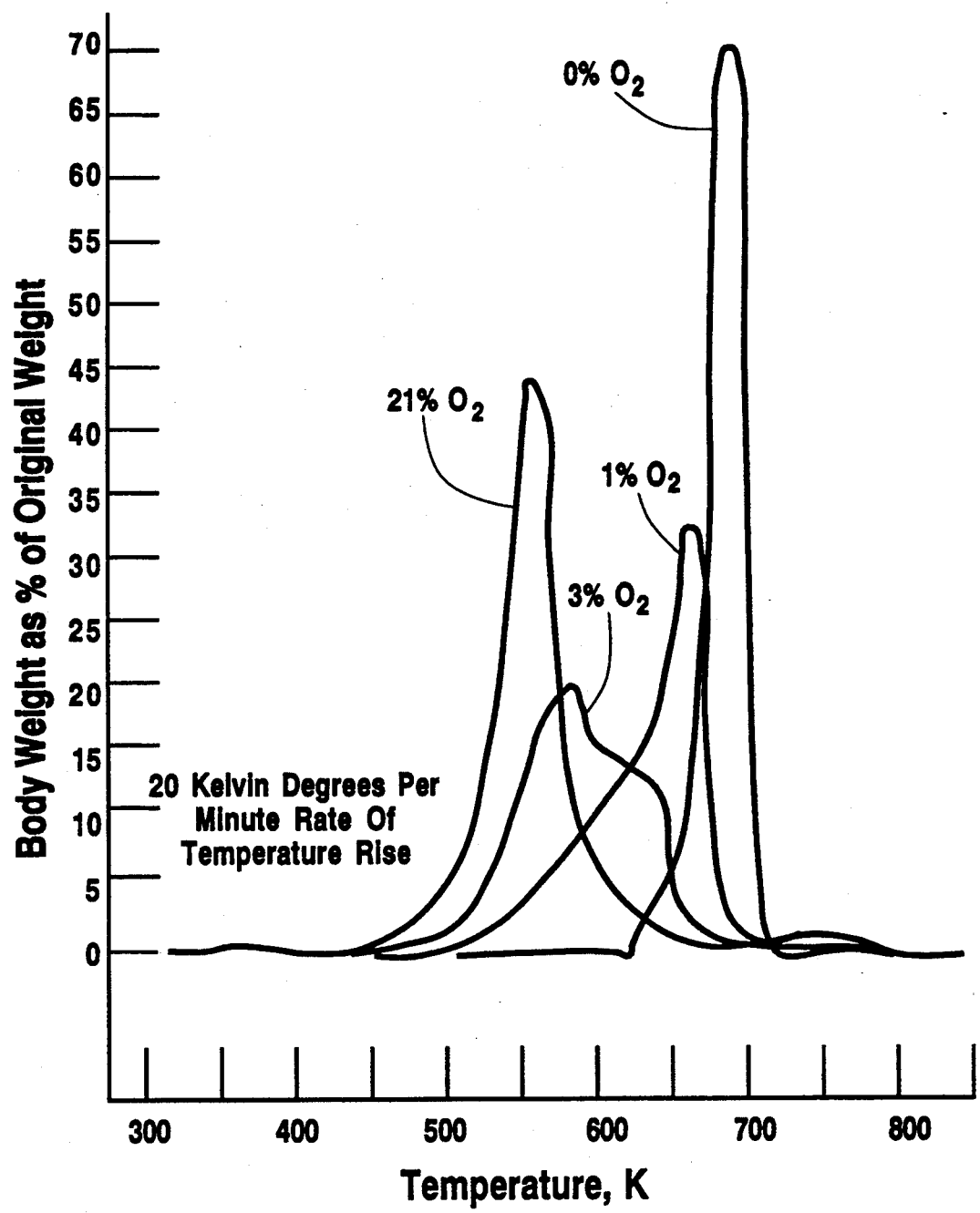
FIG. 2 is a plot of body weight loss rate in percent per minute versus temperature for various oxygen concentrations provided in debinding specimens in an environment of nitrogen and oxygen at a constant rate of body temperature rise of 20 Kelvin degrees per minute.

Provided during the heating of the specimen is a gaseous environment of inert gas containing a constant oxidizer concentration. The oxidizer is preferably oxygen, but may be carbon dioxide, nitrous oxide or water vapor. For the purposes of this invention, an oxidizer concentration that varies no more than 20% from a mean concentration may be considered constant. The inert gas is preferably nitrogen because of its low cost, but may also be an inert gas such as argon or helium. The specimen weight loss rate occurring during the heating is measured, a process known as thermogravimetric analysis. The resulting data may be plotted for analytical convenience as shown in FIG. 1. From these data, the derivative of the specimen weight loss as a function of temperature is obtained, and then multiplied by the heating rate employed, thus producing a curve of specimen weight loss rate as a function of temperature, as shown in FIG. 2. The curve typically exhibits a maximum or peak rate of weight loss. In removing binder from a body by heating at a constant rate of temperature rise, as employed in this particular experiment with the specimen, damage to the specimen, or the body of which the specimen is representative, is most likely to be caused by the gas evolution which is at a maximum rate at the time of the peak weight loss rate. Hence the experiment identifies the critical ranges of values of variables where debinding damage to the body is likely.

The experiment is repeated on similar specimens varying the constant temperature rise rate and the oxidizer concentration in the gaseous environment. The curves of weight loss rate are plotted for each experiment. From these curves, the maximum or peak specimen weight loss rate occurring during heating at each rate of temperature rise for each oxidizer concentration is observable.

Figure 3:
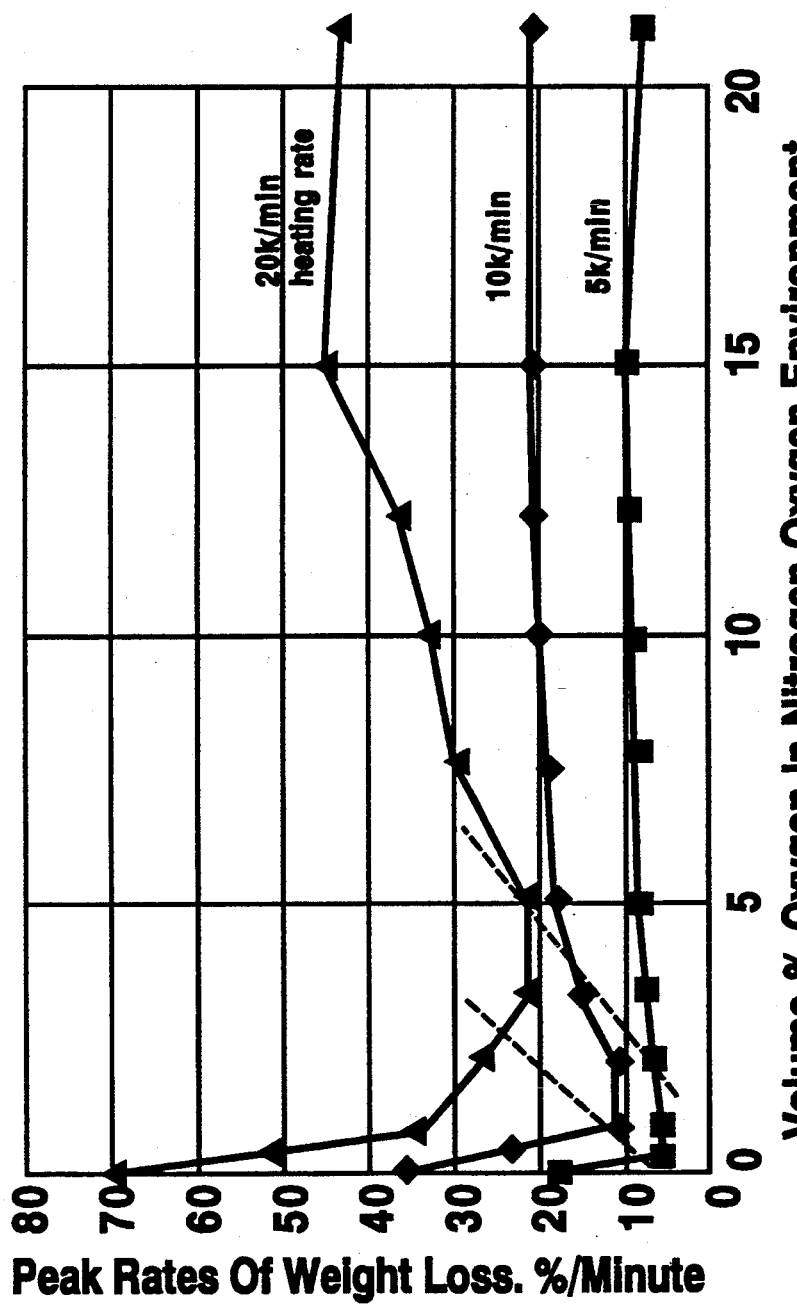
FIG. 3 is a plot of the peak rate of body weight loss as a function of oxygen concentration in a debinding environment of nitrogen and oxygen, as observed for three different rates of body temperature rise.

For convenience the maximum weight loss rates may be plotted as a function of oxidizer concentration in parameters of constant rate of temperature rise, as shown in FIG. 3. It is evident that for each rate of temperature rise, there is a corresponding oxidizer concentration at which the peak rate of weight loss is lowest, or a combination of rate of temperature rise and oxidizer concentration corresponding to each peak rate. Since damage is most likely to occur to a body by gas evolution at the time of peak rate of weight loss, and most likely during highest rates of peak weight loss, it is desirable to debind a body for any rate of temperature rise at an oxidizer concentration that will produce approximately the lowest peak weight loss rate. While oxidizer concentrations producing the minimum peak weight loss at a given rate of temperature rise are preferred, oxygen concentrations at which peak weight loss rates not greater than 120% of the lowest peak weight loss rate are usable.

EXAMPLE

Polyethylene glycol was selected for experimentation as representative of the binder types of interest described above. The specific material used was polyethylene glycol having an average molecular weight of 10,000 and a melting temperature of 336K, as obtained from the Aldrich Chemical Company, Inc. under catalog number 30,902-8. Specimens were prepared comprising 20 weight percent of this binder and alumina, specifically Alcoa A-16 SG alumina. The green specimens, that is, the specimens as prepared, were circular discs approximately 2 centimeters in diameter, 0.64 centimeters in thickness and 7 grams in weight.

The specimens were subjected to thermogravimetric analysis. Each specimen was individually heated at a constant rate of temperature rise in a chamber through which a flow of nitrogen containing a constant concentration of oxygen was passed. During heating, each sample was automatically weighed by instrumentation which provided a graph of body weight as a percentage of original (green) weight as a function of temperature. Typical data are shown in FIG. 1. The instrumentation also provided the derivative of the sample weight, that is, the body weight loss rate as a function of time, and as a function of temperature. Shown in FIG. 2 is typical body weight loss rate as a function of temperature. From these curves, the peak weight loss rate was observable for combinations of oxygen concentration and rate of temperature rise. Next, the peak weight loss rates were plotted versus oxygen concentration in parameters of rate of temperature rise, as shown in FIG. 3.

Since shortest times in debinding are desirable, highest tolerable rates of temperature rise in debinding are desirable. However damage to a green body during debinding is usually caused by an intolerably high momentary gas evolution rate. Consequently it is desirable to debind at the highest rate of temperature rise that yields a tolerable gas evolution rate, in effect, a tolerable momentary or peak gas evolution rate. Gas evolution rates are conveniently measured by body weight loss rate. Thus debinding processes are desirable that produce the lowest peak rates of body weight loss. FIG. 3 allows such processes to be selected.

FIG. 3 reveals desirable combinations of rate of temperature rise and oxygen concentration for use in debinding green objects more rapidly than heretofore practicable. At a rate of temperature rise of 5 K/min, lowest peak rates of weight loss are obtained at about 0.4% to about 2% oxygen concentration. At a rate of temperature rise of 10 K/min, lowest peak rates of weight loss are obtained at about 0.8% to about 4% oxygen concentration. At a rate of temperature rise of 20 K/min, lowest peak rates of weight loss are obtained at about 2.5% to about 6% oxygen concentration.

The lowest of the peak rates of weight loss is about 50% of the peak rate in air and less than 30% of the peak rate in pure nitrogen. Thus the advantage of debinding in a selected, controlled atmosphere of nitrogen and oxygen is apparent. It is desirable to operate the debinding process in an environment with an oxygen concentration such that, for a given rate of temperature rise, at least in the temperature region where the maximum rate of gas evolution occurs, that is, where the maximum rate of loss of body weight occurs, the peak rate of loss of body weight is not more than approximately 30% greater than the lowest peak rate of body weight loss occurring at such rate of temperature rise. It is preferable to operate the debinding process in an environment with an oxygen concentration such that, for a given rate of temperature rise, in the temperature region where the peak rate of gas evolution occurs, that is, where the peak rate of loss of body weight occurs, the peak rate of loss of body weight is the lowest peak rate of body weight loss occurring at such rate of temperature rise.

With polyethylene glycol binder, desirable oxygen concentrations as a function of rate of temperature rise lie between the dashed lines in FIG. 3. Analytically expressed, desirable oxygen concentrations lie between: a lower value determined by extrapolation from, or interpolation between, the values of 0.4% and 2.5% oxygen as a function of corresponding rates of temperature rise of 5 and 20 Kelvin degrees per minute; and an upper value determined by extrapolation from, or interpolation between, the values of 2% and 6% oxygen as a function of corresponding rates of temperature rise of 5 and 20 Kelvin degrees per minute. In practice the highest tolerable rate of temperature rise for a particular body in the critical temperature region where peak weight loss occurs will be a function of the body size and shape and oxygen concentration in its debinding atmosphere, and thus will have to be determined experimentally for the specific body. However, by using this invention to determine desirable oxygen concentrations, the number of experiments to determine a tolerable rate of temperature rise in combination with an oxygen concentration are appreciably reduced.

Inasmuch as the invention can be practiced by employing gaseous environments having nitrogen and a small concentration of oxygen, such as, from about 0.4 to about 6 percent by volume of oxygen, the invention offers the advantage that such environments can be inexpensively provided by the separation of air with permeation or adsorption techniques.

Although the invention has been described with reference to specific embodiments, it will be appreciated that it is intended to cover all modifications and equivalents within the scope of the appended claims.

What is claimed is:

1. A process for producing an article of sintered particles, said process comprising:
    (a) forming a green body from particulates and a binder, said binder being one for which at a constant heating rate, the temperature at which 50% body weight loss occurs in inert gas is at least 75 Kelvin degrees higher than the temperature at which 50% body weight loss occurs in air;
    (b) heating the green body in a gaseous environment of inert gas and oxidizer to remove said binder therefrom, said heating being controlled to provide a substantially constant rate of temperature rise in the green body in the temperature range where a peak rate of binder body weight loss occurs; and
    (c) controlling by varying oxidizer concentration in the gaseous environment such that the combination of the rate of temperature rise and said oxidizer concentration results in minimizing the peak rate of binder weight loss at said rate of temperature rise.

2. The process as in claim 1 wherein said oxidizer concentration is varied to produce a rate of body weight loss not more than approximately 30% greater than the lowest peak rate of body weight loss for said constant rate of temperature rise.

3. The process as in claim 1 wherein said oxidizer concentration is varied to produce a rate of body weight loss not greater than the lowest peak rate of body weight loss for said constant rate of temperature rise.

4. The process as in claim 1 wherein said binder is a polymer or copolymer with an oxygen linkage in its main chain.

5. The process as in claim 1 wherein said binder is a polymer or copolymer of ethylene oxide, propylene oxide and/or acetyls.

6. The process as in claim 1 wherein said oxidizer is oxygen.

7. The process as in claim 6 wherein said binder is a polyethylene glycol and said oxygen concentration lies between a lower value determined by extrapolation from, or interpolation between, the values of 0.4% and 2.5% oxygen as a function of corresponding rates of temperature rise of 5 and 20 Kelvin degrees per minute, and an upper value determined by extrapolation from, or interpolation between, the values of 2% and 6% oxygen as a function of corresponding rates of temperature rise of 5 and 20 Kelvin degrees per minute.

8. The process as in claim 6 wherein said gaseous environment is comprised of a gaseous mixture produced by the separation of air using permeation or adsorption techniques.

9. A method of determining an effective oxidizer concentration range for removing binder from a green body comprising particulates and binder by heating in a gaseous atmosphere of oxidizer and inert gas, said method comprising:

(a) forming a green body from particulates and a binder, said binder being one for which, at a constant heating rate, the temperature at which 50% body weight occurs in inert gas is at least 75 Kelvin degrees higher than the temperature at which 50% body weight loss occurs in air;

(b) heating a specimen representative of said green body, at a substantially constant temperature rise rate, to a temperature at which specimen binder weight loss resulting from said heating ceases, said heating being carried out in a gaseous environment of inert gas and oxidizer, the oxidizer concentration being held constant;

(c) measuring the peak specimen binder weight loss rate occurring during said heating of the specimen;

(d) repeating said heating and measuring steps (b) and (c) for several different oxidizer concentrations; and (e) selecting an oxidizer concentration at which the peak specimen binder weight loss rate is not greater than 130% of the lowest specimen binder weight loss rate obtained at said constant temperature rise rate.

10. The process as in claim 9 and including varying said constant temperature rise rate and carrying out heating and measuring steps (b) and (c) at the thus-varied constant temperature rise rate quantities of said green body, and carrying out steps (d) and (e) at said varied constant temperature rise rate conditions.

11. The process as in claim 9 wherein, in step (e), the oxidizer concentration selected is the one at which the lowest peak specimen binder weight loss rate occurs at the constant temperature rise rate occur.

* * * * *